Dec. 2, 1958  E. D. HILLEBRAND  2,862,667
AUTOMATIC CONTROL FOR RANGE
Filed Oct. 25, 1954  4 Sheets-Sheet 1

Inventor
EARL D. HILLEBRAND
Carlson, Pitzner, Hubbard + Wolfe
Attys.

Dec. 2, 1958    E. D. HILLEBRAND    2,862,667
AUTOMATIC CONTROL FOR RANGE
Filed Oct. 25, 1954    4 Sheets-Sheet 2
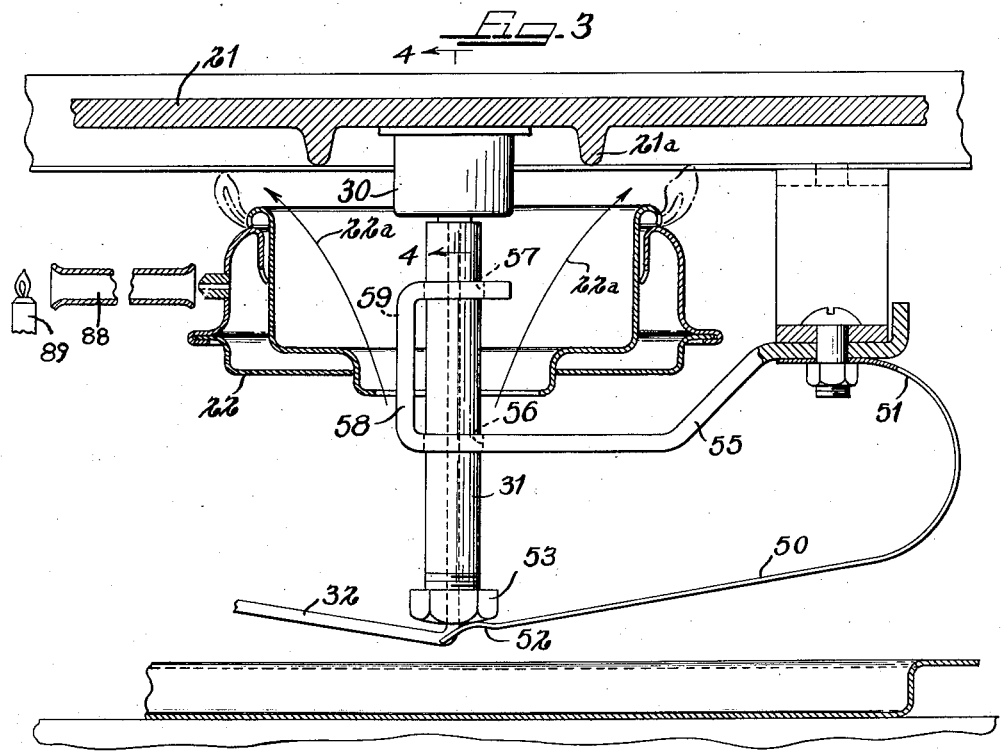
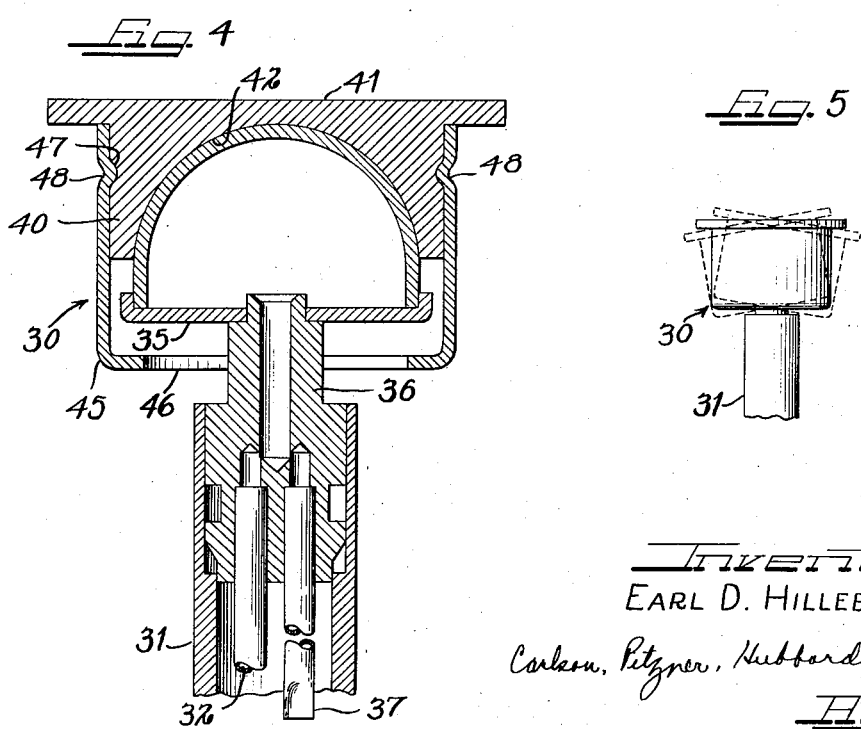
Inventor
EARL D. HILLEBRAND
Carlson, Pitzner, Hubbard & Wolfe
Attys.

Dec. 2, 1958     E. D. HILLEBRAND     2,862,667
AUTOMATIC CONTROL FOR RANGE
Filed Oct. 25, 1954     4 Sheets-Sheet 3
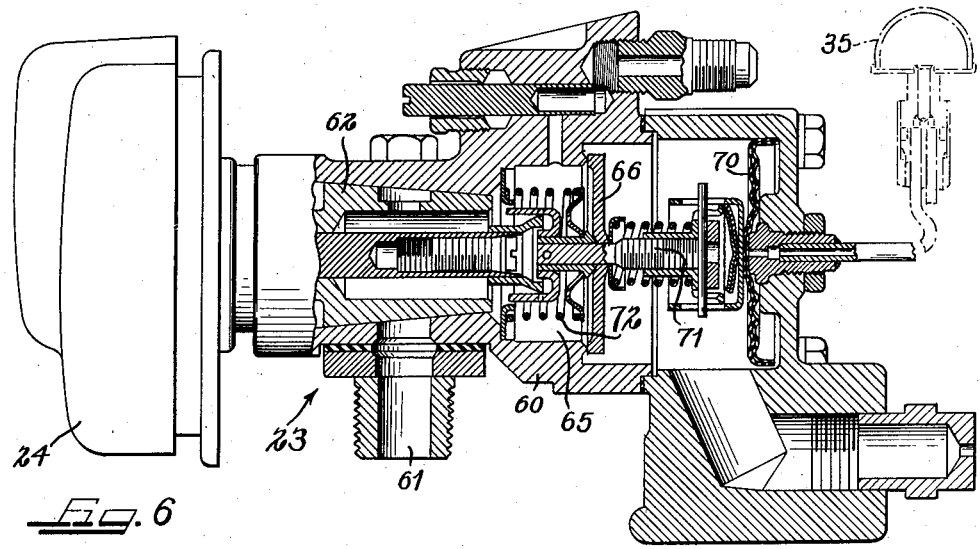
Fig. 6
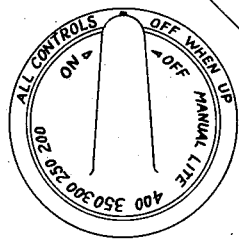
Fig. 7
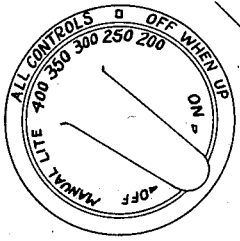
Fig. 8
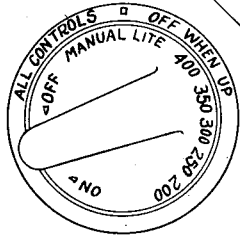
Fig. 9
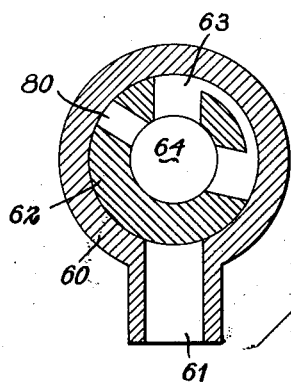
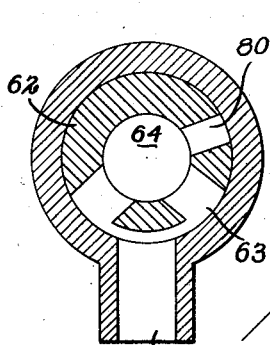
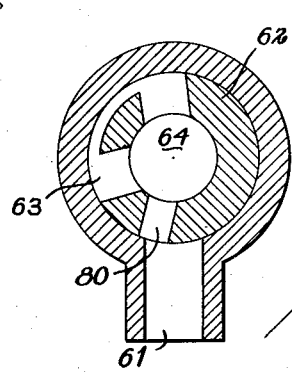
INVENTOR
EARL D. HILLEBRAND
Carlson, Pitzner, Hubbard & Wolfe
ATTYS.

Dec. 2, 1958 E. D. HILLEBRAND 2,862,667
AUTOMATIC CONTROL FOR RANGE
Filed Oct. 25, 1954 4 Sheets-Sheet 4
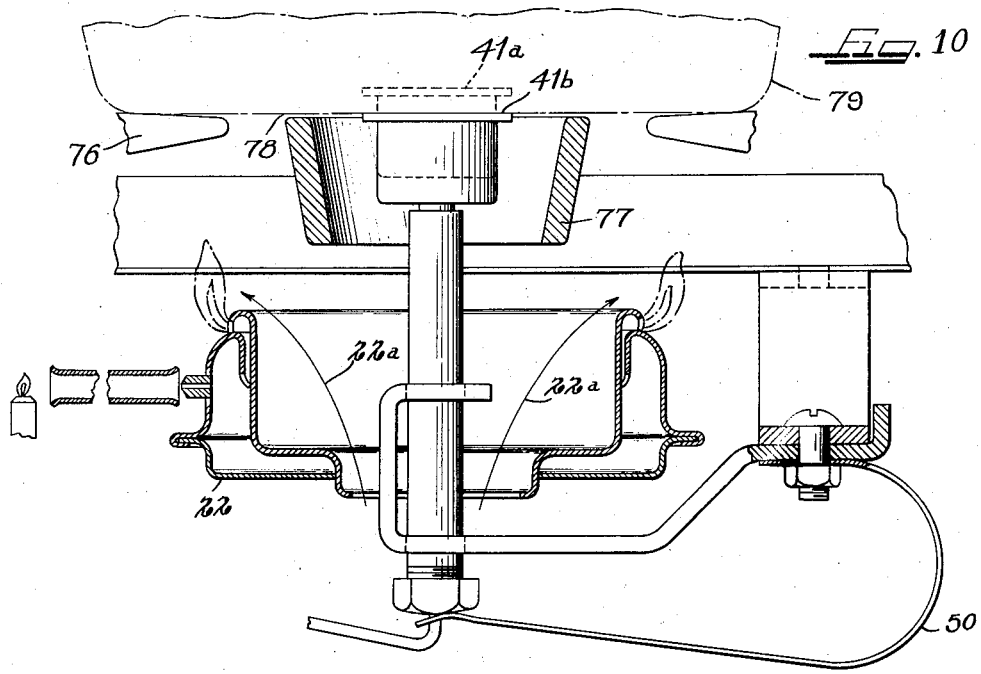
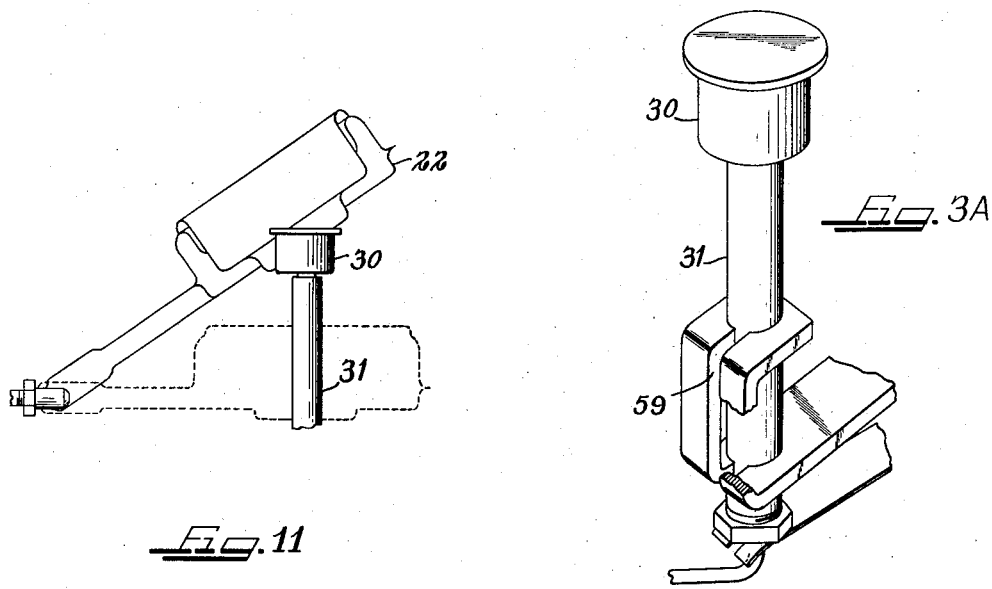
Inventor
EARL D. HILLEBRAND
Carlson, Pitzner, Hubbard & Wolfe
Attys.

United States Patent Office 2,862,667
Patented Dec. 2, 1958

2,862,667

AUTOMATIC CONTROL FOR RANGE

Earl D. Hillebrand, Kankakee, Ill., assignor to Geo. D. Roper Corporation

Application October 25, 1954, Serial No. 464,257

12 Claims. (Cl. 236—32)

The present invention relates to ranges and more particularly to means for controlling the temperature of a griddle or other cooking utensil.

It is the primary object of the present invention to provide a means for controlling the temperature of a cooking utensil which is accurate and quickly responsive to changes in demand. It is another object to provide a temperature control which responds directly and substantially immediately to the temperature of the utensil.

It is another object to provide a temperature control in which the temperature sensing element is in intimate thermal contact with a griddle or the like but in which such griddle may be conveniently and quickly replaced by a conventional pot or pan without affecting the efficiency or accuracy of the control. The griddle may, for example, be replaced by a pot of fat for deep frying, by a pressure cooker or by an open cooking vessel, all utilizing the same sensing element. It is a more detailed object to provide a temperature sensing element which is maintained in heat-transferring contact with the underside of griddle or other cooking utensil and which is upwardly biased and self-alining to compensate for differences in the angling as well as the height of the contact surface. It is another detailed object to provide a temperature sensing element which insures good thermal contact but which need not be accurately oriented, either initially during manufacture or during subsequent use and which is, consequently, proof against rough handling or other mistreatment.

It is a further object to provide a temperature sensing arrangement which responds solely to the temperature of a cooking utensil and is not directly affected by the flame or other source of heat used for heating the cooking surface. It is a more specific object, related to the foregoing, to provide a temperature control of the above type which is not affected by casual air currents or drafts.

It is still another object to provide a heat sensing element for contacting the underside of a griddle or the like which is arranged concentrically with respect to a burner but which, nevertheless, permits the burner to be readily removed for normal cleaning and maintenance.

It is a still further object to provide a temperature control for a removable griddle which has a high degree of accuracy and reliability but which, nevertheless, may be easily and inexpensively manufactured and installed, adding relatively little to the total cost of the range. It is a more detailed object to provide a temperature control which, for the most part, utilizes standard commercially available thermostatic valves and control elements and which requires a minimum of specialized machine work. It is a related object to provide a temperature control for a griddle or the like which requires minimum modification of the range and in which the mounting requirements are extremely simple. It is another object to provide a temperature control of the above type which may be easily and quickly removed as a unit for service or maintenance.

In another aspect of the invention, it is an object to provide a temperature control which is capable of maintaining a griddle or the like at a set temperature but which includes provision for manually establishing the height of the flame. It is another object to provide a combined automatic and manual control in which manual control takes place at the high end of the thermostatically controlled range and in which the thermostat is effective to reduce the flame in the event that dangerously high temperatures are reached. This prevents damage to the utensil and to the thermostat itself.

It is an object to provide a temperature control for a griddle or the like in which the temperature cannot exceed the set value and which prevents any tendency toward overheating during periods of nonuse between successive batches and which therefore reduces smoking which is usually associated with griddle cookery. In this connection it is also an object to provide an automatic control arrangement for deep fat frying in which the predetermined temperature is maintained between successive batches. It is likewise an object, where the device is used with a frying pan or griddle, to prevent "burn on" of grease and to enable the utensil to be more easily cleaned.

It is furthermore an object to provide means for heating griddle or other cooking surfaces with maximum efficiency, using a minimum amount of fuel.

It is another object of the invention to provide a means for heating a griddle or the like which is safe and which provides for rapid and positive reignition in the event of failure of the flame resulting either from excessive draft or temporary failure of the pressure in the gas supply line.

Other objects and advantages of the invention will become apparent upon reading the attached detailed description and upon reference to the drawings in which:

Fig. 3 is a vertical section taken through the center of the burner and griddle in Fig. 1.

Fig. 3a is a fragmentary perspective showing the slotted supporting bracket and spring structure.

Fig. 4 is an enlarged fragmentary section taken through the thermostatic head and along the line 4—4 in Fig. 3.

Fig. 5 shows the range of tilting movement of the head in Fig. 4.

Fig. 6 is a longitudinal section of a thermostat control device for use with the head shown in Fig. 4.

Figs. 7, 8 and 9 show three settings of the control knob of the device shown in Fig. 6 and the port arrangement corresponding to such settings.

Fig. 10 is a vertical section taken along the line 10—10 in Fig. 2.

Fig. 11 shows the manner in which the burner is tilted in order to clear the thermostat head for removal from the range.

While the invention is described in connection with a preferred embodiment, it will be understood that I do not intend to limit the invention to such embodiment but intend to cover all alternative embodiments and constructions falling within the spirit and scope of the appended claims.

Figure 1:
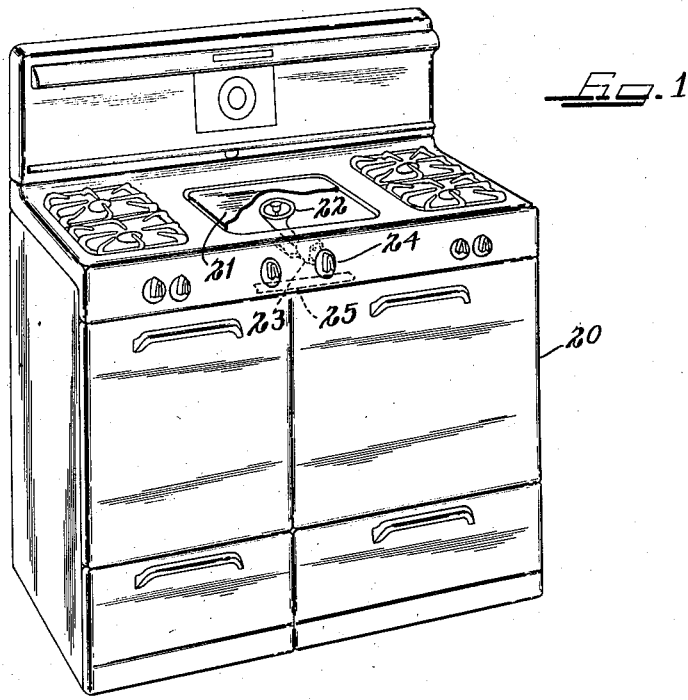
Figure 1 shows a range having a griddle arranged for thermostatic control in accordance with the present invention and with the griddle in partial section.

Turning now to Figure 1, a range 20 is shown having a griddle 21 heated by a burner 22. Gas is fed to the burner 22 from a thermostat control device 23 having a manual control knob 24 and supplied from a supply line or header 25.

Arranged centrally within the burner 22 and in contact with the underside of the griddle 21 is a thermostat head 30 supported on a vertical pedestal 31. A flexible metallic tubing 32 connects the thermostat head 30 to the thermostat control device 23.

Turning to the enlarged vertical section shown in Fig. 4, it will be noted that the thermostat head 30 includes a hemispherical bulb 35 which is mounted on a stem 36. Connected to the lower end of the stem is the tube 32 leading to the thermostat control device, as well as a fill tube 37. After the bulb and connected tubing are filled with fluid the lower end of the fill tube 37 is sealed by crimping or the like. Cooperating with the hemispherical bulb 35 is a contact cap 40 made of aluminum or other good conducting metal. Such contact cap has a flat top surface 41 and a concave underside 42 which fits snugly over the bulb 35, being rockable thereon with a ball and socket or "universal" action through a limited range as shown in Fig. 5. For the purpose of maintaining the contact cap 40 captive on the bulb 35 and for thermally shielding the bulb, a cylindrical skirt 45 is provided having an inturned flange 46 along its lower edge. The skirt 45 is telescoped over the body of the contact cap 40. Preferably the skirt and cap have a detent connection which is provided by machining a circumferential groove 47 around the body of the cap and by dimpling the skirt at spaced points as shown at 48.

In carrying out the present invention the thermostat head 30 is upwardly biased into contact with the underside of the griddle 21 so that the upper surface 41 of the cap alines itself flatly against the underside of the griddle and into intimate thermal contact therewith. In the present instance the bias is provided by a C-spring 50 having an anchoring portion 51 which is connected to the frame of the range and a cantilever portion 52, the end of which presses against the bottom end of the pedestal 31. In order to reduce the friction at the point of contact, the pedestal 31 preferably terminates in a threaded cap having a rounded undersurface and having a central opening for passage of the tube 32. The end 52 of the C-spring is suitably slit or bifurcated to allow clearance for the tube 32 so that the tube does not interfere with the action of the spring.

For the purpose of vertically guiding the pedestal 31 on which the thermostat head 30 is mounted, a guide bracket 55 is provided having spaced guide portions with alined holes 56, 57, the holes being dimensioned to provide a loose sliding fit with the cylindrical pedestal. The interconnecting portion 58 of the bracket 55 preferably is slotted longitudinally as at 59 (Fig. 3a) to provide clearance for the tube 32. When the cap 53 is unscrewed the thermostat head and its associated pedestal, along with the control device 23, may be removed as a unit for servicing and the like, the tube 32 being slipped sideways through the slot 59.

In order to reduce the effect of direct radiation from the flame of the burner 22 the griddle 21 is provided with a skirt 21a. As shown in Fig. 3 the depending skirt 21a is preferably of heavy cross-section and is cast integrally with the griddle 21. This tends to insure that the temperature of the bulb is an accurate measure of the temperature of the griddle regardless of the height of the flame.

It is one of the further features of the present device that direct heat transfer from the flame to the thermostat by convection currents is avoided. This results largely from the fact that the thermostat head 30 is centered within the central opening in the burner 22. Thus the secondary air which passes up through the middle of the burner follows an annular path indicated approximately at 22a, forming an isolating blanket and tending to deflect the convection currents radially outward along the underside of the griddle.

Turning to Fig. 6, the thermostat control device 23 is shown in partial section. The device includes a body 60 having an inlet 61 and a ported valve member 62 which is coupled to the knob 24. As shown in Figs. 7-9 the valve member 62 has an extensive sector shaped port 63 communicating with a central outlet 64. Thus, when the knob 24 is in its automatic control range, gas is admitted to a middle chamber 65, the outlet of which is under the control of a valve disc 66. The position of the disc 66 is dependent upon the temperature of the bulb 35. For this purpose a bellows 70 is provided, the bellows being coupled to the disc 66 by means of a centrally arranged and adjustable screw 71. Opposing the pressure of the bellows and arranged on the opposite side of the disc 66 is a coil spring 72. The control knob 24, as shown, is coupled to the screw 71 and the setting of the knob thus controls the equilibrium position of the disc 66. The control action is corrective so that the rate of gas flow past the disc is varied automatically to maintain the temperature of the bulb 35 at a set value. As is conventional in thermostatic control devices of this general type, an adjustable port (not shown) may be provided for bypassing the control disc 66 to prevent the flame from going out as a result of "turndown."

Because of the intimate thermal contact between the relatively massive griddle 21 and the thermostat head 30, control of the griddle temperature is precise and correction is rapidly made so as to prevent overshoot or undershoot when the load on the griddle is varied. Thus, the flame is rapidly reduced between batches to prevent overheating and is increased to a high value when a fresh batch is applied, all without care or attention on the part of the operator.

The practical effect is to prevent "burning on" of grease and the smoking usually associated with griddle cookery. When the control setting is reduced to a low value, the griddle acts as an effective "steam table" to keep food warm until used.

Figure 2:
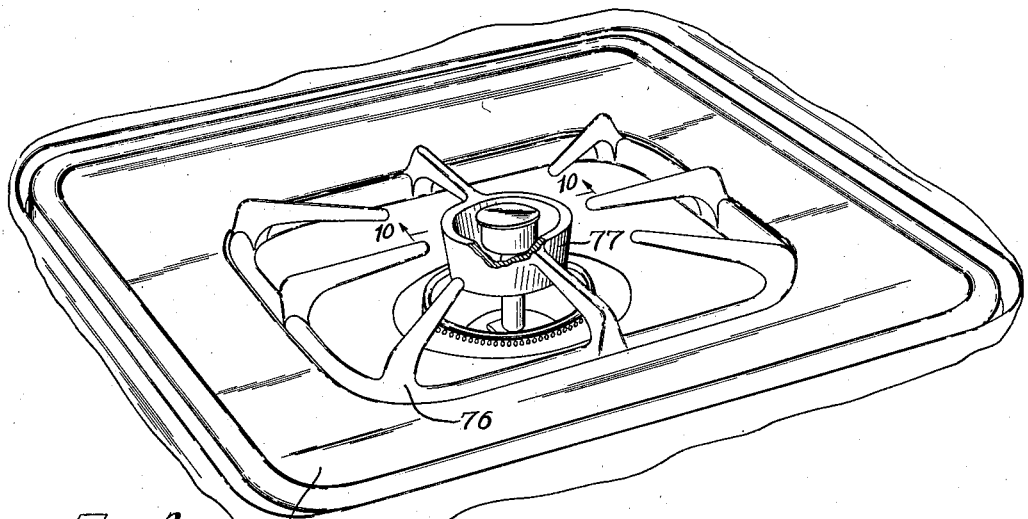
Fig. 2 shows a burner grate substituted for the griddle in Figure 1.

It is one of the features of the present device that the mounting of the thermostat head 30 and the self-alining action embodied therein enables the head and its associated control device to be used for controlling the temperature of other cooking vessels. This is accomplished simply by removing the griddle 21 from its support and replacing it with an insert or "aeration pan" 75 having a grate 76 (Fig. 2). Preferably the insert 75 is formed of a metal plate which has the same outline as the griddle 21 which it replaces, thus insuring centering of the grate with respect to the burner 22 and thermostat head 30. In the center of the grate I provide an integral shield 77 of annular shape which substantially surrounds the thermostat head 30, to shield the head from heat directly radiated from the flame, as well as from the effect of casual drafts. Further isolation is provided by the flow of secondary air 22a just as discussed in connection with Fig. 3.

As shown in Fig. 10, the shield 77 is offset downwardly a small amount from the effective supporting surface of the grate, as at 78, so that it is out of actual contact with the utensil 79. Furthermore, the supporting surface of the grate 76 preferably lies slightly below the plane 41a defined by the upper limit of movement of the thermostat head. When the utensil 79 is placed on the grate, the spring force is overcome, thereby forcing the thermostat head down to the position 41b. The force exerted by the spring 50 is sufficiently great as to cause flat seating and alinement between the head 30 and the bottom of the vessel and, if desired, the spring may be preloaded to develop sufficient force. On the other hand, the spring force is sufficiently low as to be overcome by the weight of any conventional container having a minimum load. Thus the presence of the head 30 does not in any way affect normal use of the burner 22. No special utensils are required and the arrangement works well even when used with pans having recessed bottoms.

The advantage of the construction of Fig. 10 is particularly apparent in deep fat cookery where it is necessary to keep the fat within a narrow cooking range while preventing increase of temperature between batches. It is found that the temperature of the fat may be accurately controlled by the disclosed arrangement simply by setting the control knob 24. While the control device and thermostat head forms an inexpensive addition to a gas range the accuracy of the control, in the case of deep fat frying, is equal to or better than that achieved by expensive deep fat fryers of the automatic type.

The thermostatic control arrangement described above possesses a number of advantages where the food is to be boiled or fried. In the case of boiled foods, the pan and contents are quickly brought up to boiling temperature, following which the height of the flame automatically reduces to control the rate of boiling. This is particularly desirable in the case of a pressure cooker. In the event that the pan is inadvertently allowed to go dry the flame will be still further reduced in order to minimize the scorching of the contents. In the case of frying, where higher temperatures are employed, the operation is closely analogous to that which occurs in deep frying described above, making it possible for the frying of foods to be controlled on a more scientific basis than has been possible in the past.

The automatic control device described above has a safety feature which is not present in ordinary ranges. In the event that a low flame should go out as a result of a draft or for any other reason the temperature of the head 30 immediately drops. This is interpreted by the control device 23 as a call for additional gas and gas will be supplied to the burner at a sufficient rate to cause reignition through a flash tube 88 (Fig. 3) from a pilot 89 conventionally provided on modern-day ranges.

Under some conditions it may be desirable to provide for manual control of the flame height, notwithstanding the presence of the thermostatic control unit. This is accomplished in the present instance by providing an auxiliary port 80 in the valve member 62. Such port is spaced from the segmental port 63 previously referred to and is brought into alinement with the gas supply port 61 only when the manual control knob 24 is rotated all the way around to the "high" end. Progressive rotation of the member 62 through a limited range at the high end enables the gas to be varied from full "on" to full "off." As illustrated in Fig. 9 the port 80 of the valve member 62 is approximately the three-quarter setting.

When the control knob 24 is in its high manual range the valve disc 66 is unseated for substantially free flow of gas to the outlet of the control device 23. However, in the event that greatly excessive temperatures are detected by the thermostat head 30 the bellows 70 will expand to a sufficient degree so as to tend to shut off the flow of gas past the valve disc 66. Thus, there is still a certain amount of automatic control action, for safety's sake, at the high manual end of the control range.

In the following claims the term "utensil" is used in a generic sense to include either the griddle or a food-containing vessel in contact with the thermostat head.

I claim as my invention:

1. In a range, the combination comprising a heat-conducting griddle having a flat contact area on its underside, a circular burner spaced below the griddle for heating the same and having a diameter greater than the diameter of said contact area, a settable thermostat control device for said burner, a temperature sensing element connected to the thermostat control device, means for biasing the temperature sensing element upwardly against said flat contact area and in intimate heat transferring contact therewith, and a skirt integrally formed on the underside of said griddle and surrounding said contact area for substantially shielding said temperature sensing element from direct radiation from said burner.

2. In a range, the combination comprising a utensil, a burner arranged below the utensil for heating the same, a settable thermostat control device for said burner, said control device having a temperature sensing bulb having a convex surface thereon, means for biasing the bulb upwardly toward said utensil, a heat conducting element interposed between said bulb and said utensil, said heat conducting element having a concave lower surface for mating with said convex surface to provide a limited amount of ball and socket movement with respect thereto, said heat conducting element further having a flat upper surface for intimately contacting the underside of said utensil.

3. In a range, the combination comprising a utensil having a cooking surface, a burner arrangement below the utensil for heating the same, a settable thermostat control device for said burner, said control device having a temperature sensing bulb of hemispherical shape, a mount for said bulb including means for biasing the same upwardly toward said utensil, a heat-conducting element interposed between said bulb and said utensil, said heat-conducting element having a cylindrical body provided with a flat top surface and a concave lower surface for mating with said convex surface to provide a limited amount of relative ball and socket movement, said heat-conducting element having a cylindrical inwardly-flanged skirt member for surrounding said bulb and for holding the heat-conducting element captive thereon.

4. In a range, the combination comprising a utensil, a burner arranged below the utensil for heating the same, a settable thermostat control device for said burner, said thermostat control device having a temperature sensing bulb, a pedestal vertically mounted in said range for endwise movement, said bulb being mounted at the top of said pedestal, a spring at the lower end of said pedestal for urging the pedestal upwardly in the direction of said utensil, a heat-conducting element interposed between said bulb and said utensil, said heat-conducting element having flat upper surface in intimate thermal contact with said utensil, the heat-conducting element being formed on its underside to provide a limited amount of ball and socket movement with respect to said bulb so that said heat-conducting element alines itself with said utensil substantially independently of the orientation of said bulb and pedestal.

5. In a range the combination comprising a grate having radially extending fingers with top surfaces for supporting the underside of a heat conducting utensil and having an unobstructed center portion, a burner arranged below the grate and separate therefrom for producing a ring of flame for heating the utensil, a settable thermostat control device for said burner, a temperature sensing element connected to the thermostat control device, said temperature sensing element being resiliently mounted free of contact with and in a centered position with respect to said burner so that it extends through the unobstructed center portion of the grate and presses intimately against the underside of said utensil, an annular shield supported by the grate fingers so that it is interposed between the burner flame and the temperature sensing element and free from contact with the latter and its mounting for minimizing heat transfer by direct radiation and conduction to the sensing element.

6. In a range the combination comprising a grate having radially extending fingers with top surfaces for supporting the underside of a heat conducting utensil and having an unobstructed center portion, a burner arranged below the grate and separate therefrom for producing a ring of flame for heating the utensil, a settable thermostat control device for said burner, a temperature sensing element connected to the thermostat control device, said temperature sensing element being mounted in a centered position with respect to said burner so that it presses intimately against the underside of said utensil, a continuous annular shield substantially larger in diameter than said sensing element and supported by the fingers of said grate so as to be interposed about midway between the burner flame and the temperature sensing element and free from contact with the element and its mounting for minimizing heat transfer by direct radiation and conduction to the sensing element, said shield having its upper edge so positioned below the top surface of the grate fingers as to provide clearance with the underside of a utensil carried on the grate and being arranged generally vertically and open at the bottom for free circulation of air through the clearance space and against its inner and outer surfaces.

7. In a range the combination comprising a grate having radially extending fingers with top surfaces for supporting the underside of a heat conducting utensil and having an unobstructed center portion, a ring type burner arranged below the grate and separate therefrom for producing a ring of flame for heating the utensil, a settable thermostat control device for said burner, a temperature sensing element connected to the thermostat control device, said temperature sensing element being resiliently mounted in a centered position with respect to said burner and extending through the unobstructed center portion of the grate so that it presses intimately against the underside of said utensil, an annular shield supported by the grate so that it is interposed between the burner and the sensing element for minimizing heat transfer by direct radiation from the burner flame to the temperature sensing element and free from contact with the element and its mounting to preclude transfer of heat by conduction to the element, at least one of the grate fingers extending radially inwardly to the annular shield for providing such support with the upper edge of the annular shield so positioned below the top surface of the said grate finger as to provide clearance with the underside of a utensil carried on the grate, said shield being arranged generally vertically and open at its bottom for free circulation of air through the clearance space and against its inner and outer surfaces.

8. In a range the combination comprising a top surface having an opening and supporting means adapted to support interchangeably therein a griddle with its underside disposed a substantial distance below the surface and an upraised grate with its utensil supporting face disposed a substantial distance above the surface, a burner arranged in said opening below the level of the surface, a settable thermostat control device for said burner, a temperature sensing element connected to the thermostat control device for correctively controlling the flow of gas therein, said temperature sensing element being mounted in a centered position with respect to said burner, said temperature sensing element being upwardly biased for vertical movement through a range which is sufficient to engage the underside of said griddle or the underside of a utensil supported on said grate.

9. In a range for use with a cooking utensil the combination comprising means for supporting said utensil, a burner arranged below the utensil for heating the same, a source of gas, a thermostat control device for feeding gas from said source to said burner, said thermostat control device having a manual control member settable to a temperature within a normal temperature range, said thermostat control device further having a thermostat valve and means including a thermostat bulb for correctively operating the same in accordance with the setting of the manual control member, said control member providing manual port means which is open for substantially unrestricted flow of gas to said thermostat valve over the normal range of movement thereof, said manual port means being so constructed and arranged as to vary the throttling of the gas flow progressively upon progressive movement of the control member beyond its range of normal movement for manually adjusting the height of the burner flame.

10. In a range for use with a cooking utensil the combination comprising means for supporting said utensil, a burner arranged below the utensil for heating the same, a source of gas, a thermostat control device for feeding gas from said source to said burner, said thermostat control device having a manual control member for setting a temperature control point, said thermostat control device further having a thermostat valve and means including a thermostat bulb for correctively operating the same for maintaining the temperature at the control point, said control member providing manual porting which is open for substantially unrestricted flow of gas to said thermostat valve over the major portion of the range of movement thereof, but which is so constructed and arranged as to provide progressive throttling of the gas flow upon progressive movement of the control member into the extreme upper portion of the range.

11. In a range, in combination with an annular top burner and means supporting a utensil above the burner, a settable thermostat control device for supplying gas to the burner, a temperature sensing element mounted at one end of a pedestal and connected with said device by a tube extending out through the other end of said pedestal, means supporting and guiding said pedestal for endwise movement through the burner toward and from the utensil heated thereby, said supporting and guiding means comprising a bracket stationarily mounted at one end having a pair of guide portions adjacent its other end vertically spaced apart and rigidly joined by a connecting portion, said guide portions being formed with alined holes dimensioned to receive said pedestal with a sliding fit, and said connecting portion of the bracket having a slot extending between said holes and affording clearance for said tube to permit installation and removal of the sensing element and pedestal without disturbing said bracket.

12. In a range, in combination with a annular burner and means for supporting a cooking utensil with its underside facing and spaced from the burner, a settable thermostat control device for supplying gas to the burner, a temperature sensing element connected to said device, a pedestal supporting said element at one end, said pedestal being mounted for vertical endwise movement through said annular burner toward and from the underside of the utensil being heated by the burner, a cap secured to the lower end of said pedestal, a C-shaped spring stationarily supported at one end and having its other end engaging said cap to urge the pedestal and sensing element upwardly into contact with the underside of the utensil, said cap cooperating with the pedestal mounting means to limit upward movement of the same and having its spring engaging face rounded to reduce friction.

References Cited in the file of this patent
UNITED STATES PATENTS

| | | |
|---|---|---|
| 947,914 | Junkers | Feb. 1, 1910 |
| 2,079,504 | Hobson | May 4, 1937 |
| 2,123,829 | Grayson | July 12, 1938 |
| 2,153,886 | Grayson | Apr. 11, 1939 |
| 2,456,864 | Cole | Dec. 21, 1948 |
| 2,487,946 | Senn | Nov. 15, 1949 |
| 2,500,061 | Clark | Mar. 7, 1950 |
| 2,534,097 | Akeley | Dec. 12, 1950 |
| 2,699,487 | Turner | Jan. 11, 1955 |